Patented Jan. 2, 1951

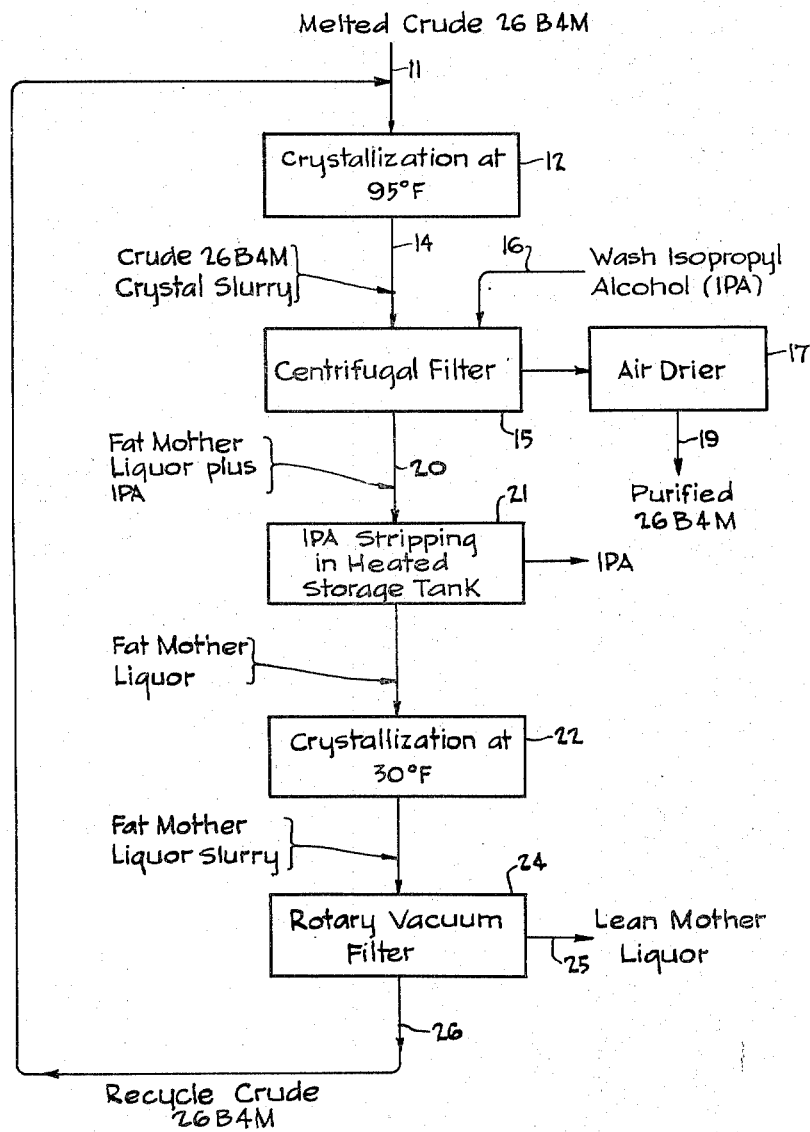

2,536,040

UNITED STATES PATENT OFFICE 2,536,040

PURIFICATION OF ALKYL PHENOLS

Donald D. Davidson, Long Beach, Calif., assignor to Shell Development Company, San Francisco, Calif., a corporation of Delaware Application March 2, 1948, Serial No. 12,582

1 Claim. (Cl. 260—624)

This invention relates to a process for the purification of polyalkyl phenols. More particularly, it pertains to the separation and recovery of tertiary alkyl phenols containing a plurality of alkyl groups from mixtures of the same with other alkyl phenols, especially those which occur in the products of alkylation of phenols, cresols and xylenols with olefinic hydrocarbons and/or tertiary alcohols.

The simple alkyl phenols such as the cresols occur in fractions obtained from the distillation of coal and from certain petroleum refinery operations. Various methods have been proposed for their separation. More recently polyalkyl phenols, and particularly those containing alkyl groups having more than one carbon atom, have been made available by methods such as the catalytic alkylation of phenol and cresols with olefinic hydrocarbons and alcohols. For instance, various tertiary butyl phenols may be prepared by the alkylation of phenol and the various cresols with isobutylene or tertiary butyl alcohol, preferably in the presence of a suitable alkylation catalyst, which causes the introduction of one or more tertiary butyl groups into the phenol nucleus. These polyalkyl phenols have found various uses in the arts, e. g. as antioxidants for hydrocarbon fractions, intermediates in the manufacture of condensation products with formaldehyde, and the like. However, the methods heretofore available for the separation of the desired polyalkyl phenol from the other phenols associated therewith, including unreacted and other lower alkyl phenols, have not been entirely satisfactory and in many instances it has been necessary to utilize mixtures which contained the desired polyalkyl phenol in proportions which were not as high as required for optimum purposes. It is known that separation difficulties are often encountered in the separation of mixtures of isomeric cresols by crystallization on account of the formation of eutectic mixtures. In the case of mixtures concerned with here, there is evidence which indicates that the polyalkyl phenols form adducts with less alkylated phenols thereby increasing the difficulties of separation.

It is, therefore, an object of the present invention to provide an improved process for the separation of mixtures of various polyalkyl phenols.

Another object is to provide a process for the separation of a given polyalkyl phenol from admixture with other alkyl phenols of lower melting point.

Still another object is to separate a tertiary alkyl polyalkyl phenol in high purity and high yield from a mixture thereof with other lower melting polyalkyl phenols.

A more specific object is to provide an improved process for recovering a di(tertiary alkyl) phenol in high purity and high yield from a mixture of alkyl phenols obtained by alkylating any one of the cresols or mixtures thereof with a tertiary alkylating agent.

A still more specific object is directed to the recovery of a di(tertiary butyl) cresol from an alkylation mixture of a cresol resulting from alkylating a cresol with a tertiary olefin or alcohol.

The foregoing objects will be better understood and others will become apparent from the description of the invention as given hereinafter.

Now, in accordance with the present invention, it has been found that the higher melting polyalkyl phenol in a mixture thereof with other alkyl phenols can be effectively and economically recovered from the mixture by a process which involves the steps of: (1) first crystallizing a substantial proportion of the higher melting polyalkyl phenol from the mixture at an elevated temperature at which substantially only, and not more than about 90% of, said higher melting polyalkyl phenol crystallizes and under which conditions the resulting slurry is readily filterable, (2) separating the crystals from the mother liquor of the resulting slurry, (3) crystallizing a second portion of said higher melting polyalkyl phenol, which is a substantial proportion thereof in said mother liquor at a substantially lower temperature than the first crystallizing temperature and under conditions at which the second resulting slurry is readily filterable, (4) separating the second portion of crystals from the resulting lean mother liquor of the second slurry, and (5) recrystallizing the second portion of crystals at a temperature substantially above the temperature of the second crystallization, such as in admixture with another portion of the original mixture at the first-mentioned crystallization temperature.

The manner in which the foregoing-described operational steps of the invention cooperate in the combination thereof will be more fully understood from a consideration of several factors involved in the separation and recovery of a given higher melting polyalkyl phenol from a mixture thereof with other lower melting isomeric polyalkyl phenols, lower melting alkyl phenols of lower molecular weight and miscellaneous impurities which are normally present in a crude mixture of polyalkyl phenols such as are produced in alkylations of phenols. In order to simplify a discussion of these factors, consider a mixture of crude phenols such as may be obtained by alkylating para-cresol with isobutylene in proportions and under conditions to yield a mixture of alkyl phenols containing a major proportion (say 60 to 90 mol per cent) of 2,6-ditertiary butyl-4-methyl phenol (26B4M), together with a substantial proportion (say 10 to 30 mol percent) of 2-tertiary butyl-4-methyl phenol (2B4M), with or without some unchanged 4-methyl phenol (p-cresol). When this mixture is crystallized at a temperature which is sufficiently low to ensure a satisfactory recovery yield (90+%) of the higher melting 26B4M, the crude mixture sets to a solid mass and an unsatisfactory purification of the 26B4M results. On the other hand, when the conditions of crystallization are adjusted so as to produce readily workable crystal slurries the recovery yields are not satisfactory. This is shown by the fact that when such a crude mixture as indicated above containing 80 mol percent of 26B4M was crystallized at a temperature of about 95° F. the viscosity of the resulting slurry was greater than 12,000 centistokes and near the viscosity condition of being not readily filterable, the 26B4M recovery was only 75%. However, it has been found that when a major proportion of the 26B4M present in the crude mixture (say 60 to 80%) has been removed substantially alone by a crystallization at an elevated temperature, such as from about 85° F. to about 120° F., at which a workable crystal slurry is obtained, the remaining mixture can be crystallized at a low temperature, e. g. 25–40° F., to produce a readily workable slurry containing crystals of a major proportion of the 26B4M still present in said remaining mixture and having a purity of from about 60 to 90 mol percent. This second crystal product can be recrystallized alone, or when admixed with a portion of the original crude mixture, at an elevated temperature as in the first step to yield a satisfactory recovery of high purity product. It is advantageous from the operational standpoint to correlate the first and second crystallization temperatures, in conjunction with the respective concentrations of 26B4M in the mixture being crystallized, so that a satisfactory purity material is obtained from the first step and a second crystal product is obtained from the second step which corresponds in 26B4M content to that of the original charge. This will appear from the detailed description given hereinafter.

The method of the present invention may be applied to various mixtures of alkyl phenols, generally containing a total of from one to 20 carbon atoms in all alkyl groups thereof, in which mixtures there are present at least two different alkyl phenols having different melting points and at least one of the alkyl phenols is a polyalkyl phenol. The invention is particularly applicable to the separation of polyalkyl phenols containing at least one tertiary alkyl group from mixtures thereof with lower melting alkyl phenols which contain only primary alkyl groups. A preferred application of the invention is in the separation of polyalkyl phenols which contain at least two tertiary alkyl groups from mixtures thereof with lower melting alkyl phenols and polyalkyl phenols which contain no more than one tertiary alkyl group. Some illustrative examples of mixtures of phenols to which the invention may be applied with advantage are mixtures of: 2,6-ditertiary butyl-4-methyl phenol and 2-tertiary butyl-4-methyl phenol; 2-tertiary butyl-4-methyl phenol and 4-methyl phenol; 2-methyl-4-tertiary butyl phenol and 2-methyl phenol; 2,4-ditertiary butyl-6-methyl phenol, 2-methyl-4-tertiary butyl phenol and/or 2-methyl-6-tertiary butyl phenol; 2,4-dimethyl-6-alkyl phenol wherein the alkyl may be any alkyl group but is preferably a secondary or tertiary alkyl group containing from three to twelve carbon atoms and 2,4-dimethyl phenol; dialkyl-metacresols (2,4- and 2,6 isomers) and monoalkyl metacresols; monoalkyl metacresols and metacresol; 2,4,6-trialkyl metacresol and corresponding dialkyl metacresols, 2-, 4- or 6- tertiary amyl-3,4-dimethyl phenol and 3,4-dimethyl phenol; etc.

It will be understood that in carrying out the present invention it may be found to be advantageous to effect some of the crystallizations from suitable solutions of the mixtures in suitable physical solvents therefor although for many mixtures entirely satisfactory results are obtained when the crystallizations are made from the molten mixture in the absence of any extraneous solvent. When the crystallizations are effected in the presence of solvents the corresponding temperatures in general are proportionately lower than in the absence of any solvent. Of course, various wash solutions may be utilized for washing the mother liquor from the filtered or centrifuged crystal masses as will be readily understood.

Having described the invention in a general manner, having pointed out how it is to be practiced, and having discussed various factors to be considered in its application, the invention will be better understood from a description of a preferred embodiment thereof and which is made with reference to the accompanying drawing, which is a diagrammatic flow scheme, the description and drawing being limited to a particular mixture of alkyl phenols only for the purposes of illustration and clarity and with no intention of limiting the invention thereto.

Referring to the drawing, a crude mixture of 2,6-ditertiary butyl-4-methylphenol (26B4M), such as is obtained when para-cresol is alkylated with isobutylene or tertiary butyl alcohol in the presence of an alkylating catalyst therefor (sulfuric acid, etc.), in proportions and under conditions selected to yield as the major product a di-tertiary butylated product as is well understood in the art, and containing, for example, about 80 mol percent of the 26B4M compound, was melted in a suitable storage tank (not shown) and delivered through a line 11 to a crystallization zone 12. The temperature of the crude mixture was adjusted to about 95° F., at which temperature a fluid slurry of crystals of 26B4M in the remaining molten mixture was obtained. The crude slurry was transferred by means of a line 14 to a centrifugal filter 15 wherein the crystals were separated from the fat mother liquor. The separated crystal mass was washed in the centrifuge with a suitable wash liquid, such as isopropyl alcohol, drawn from a suitable source (not shown) through a line 16. The washed crystals were then transferred to an air drier 17 and the purified 26B4M removed by means of a line 19. The fat mother liquor plus isopropyl alcohol wash liquid was transferred by line 20 to a suitable tank or vessel 21, provided with suitable heating means (not shown), and the isopropyl alcohol stripped from the fat mother liquor. The fat mother liquor was then partially crystallized at a temperature of about 30° F. in a crystallizing zone 22 and the resulting fat mother liquor slurry filtered on a suitable rotary vacuum filter 24, with the separation of a crystalline mass containing about 80 mol per cent of 26B4M, and of a lean mother liquor containing about 25 to 30 mol per cent of 26B4M, which was withdrawn by line 25. The separated crystalline mass of 80% 26B4M (recycle crude) was melted and recycled by lines 26 and 11 to crystallization zone 12 for recrystallization at about 95° F., together with a further charge of crude stock. If desired, the lean mother liquor in line 25 may be crystallized at a still lower temperature than the second crystallization temperature, the third portion of crystals separated and returned to crystallization zone 22, after being melted, for recrystallization at about 30° F., along with the fat mother liquor.

For simplicity of blending of recycled crude 26B4M material, it is usually preferable to effect a given crystallization, after the first one, at a temperature which yields a crystalline product having a 26B4M content substantially the same as the 26B4M content of the material with which it is to be mixed prior to recrystallization. Thus, with the selection of 95° F. as the first crystallizing temperature, which is about the minimum for the given crude mixture to ensure both a readily workable (filterable) mass and the desired purity of 98+%, the composition of the resulting fat mother liquor is substantially fixed. This fixed composition in turn determines the upper limit of the second crystallizing temperature required to yield a crystal product which can be most readily blended with the original feed for crystallizing in the first crystallization step, that is a product having substantially the same composition or at least of the same 26B4M concentration. It also determines the lower limit of the second crystallizing temperature below which a nonworkable mass is obtained. To illustrate, when the first crystallizing temperature is to be maintained at a higher temperature than 95° F., say at 110° F., a high purity 26B4M product is obtained, but in a smaller yield. The resulting fat mother liquor is proportionately richer in 26B4M, consequently requiring that the second crystallizing temperature be fixed at an adjusted temperature which is lower than the previous temperature used for this step, in order to produce a second crystal product of only 80% 26B4M content and therefore most suitable to be recycled to the feed charge of 80% 26B4M content. But, any substantial reduction in the second crystallizing temperature tends to yield an unworkable mass. This is readily understood when it is considered that as the concentration of 26B4M in the first fat mother liquor approaches that of the feed stock, which occurs as the temperature of the first crystallization is increased with less removal of 26B4M, the situation, and problems associated therewith, are approached which correspond to crystallizing the feed stock at the lower temperature in the first place. Similar considerations apply to a correlation of the conditions of a third crystallization, as applied to the lean mother liquor from the second crystallization, with the conditions of the second crystallization. To generalize, it is preferable to effect the first crystallization at about the minimum temperature, or not more than about 25° F. above said minimum temperature, at which the resulting mass is satisfactorily workable, and then to effect the second crystallization at a temperature, within plus or minus 10° F., at which the separable crystalline mass has the same content of the higher melting alkyl phenol within about 10 mol percent, plus or minus, as that of the first charge stock.

The data in Table I below summarize pertinent operating data from a plant scale operation of the process as described above with reference to the drawing:

TABLE I

*Purification of 2,6-ditertiary butyl-4-methyl phenol (26B4M)*

| Feed Charged to Crystallization | Weight Charge, Pounds | 26B4M in Charge, Percent m. | Crystallization Temp., °F. | IPA Wash, Gal. IPA per gal. Charge | 26B4M Recovered, Pounds | 26B4M Purity, Percent m. | 26B4M Recovery, Percent Weight in Charge |
|---|---|---|---|---|---|---|---|
| Crude 26B4M | 9,390 | 80 | 95 | 0.19 | 5,970 | 99 | 78.7 |
| Fat Mother Liquor | 3,390 | [1] 49 | 30 | 0.00 | 1,266 | 81 | 61.7 |
| Recycle Crude 26B4M | 1,020 | 81 | 92 | 0.23 | 651 | 98 | 77.2 |

[1] After removal of wash IPA (isopropyl alcohol) by flashing. The ultimate recovery of high purity 26B4M was about 91% by weight of the 26B4M present in the crude charge.

When a mixture of alkyl phenols containing a major proportion of 4,6 ditertiary butyl-3-methyl phenol, such as obtained by alkylating metacresol with isobutylene, is subjected to a similar coordinated two-step set of operations as described hereinbefore, substantially pure 4,6-ditertiary butyl-3-methyl phenol is obtained in an overall yield corresponding to better than 90% recovery of the 46B3M present in the mixture.

A variant to the sequence of operations described hereinbefore, and as will be readily understood by reference to Table I and the drawing, is to start with a feed charge of the character, in content of desired alkyl phenol (say 40 to 60% by weight), of the indicated fat mother liquor, first crystallize out desired alkyl phenol at the lower temperature (say 30° C.) to produce a crude crystalline product of increased content of said desired alkyl phenol, melt the separated crude material and recrystallize it at the elevated temperature to recover substantially pure crystals of the desired alkyl phenol and, after separation, recovering a fat mother liquor which is admixed with a further portion of feed mixture and reprocessed.

I claim as my invention:

A process comprising a closed cycle for separating 2,6-ditertiary butyl-4-methyl phenol from a mixture thereof with other alkyl phenols, which mixture is produced by alkylating paracresol under conditions to introduce two tertiary butyl radicals into the nucleus of about 80 mol percent of the para-cresol present and recovering the resulting alkyl phenol mixture from the alkylation reaction mixture, which process comprises: cooling a molten mass of a feed charge portion of said alkyl phenol mixture, in admixture with a recycle 2,6-ditertiary butyl-4-methyl phenol product having a 2,6-ditertiary butyl-4-methyl phenol content of about 80 mol percent produced in the process as described hereinafter, to a temperature of about 95° F., thereby producing a filterable slurry of crystals of 2,6-ditertiary butyl-4-methyl phenol in a remaining fat mother liquor; separating said crystals as product 2,6-ditertiary butyl-4-methyl phenol, representing a recovery of 2,6-ditertiary butyl-4-methyl phenol of about 91% based on the content thereof in said feed charge, from said fat mother liquor; cooling the separated fat mother liquor to a temperature of about 30° F., thereby producing a second filterable slurry of a second crystalline product and containing about 80 mol percent 2,6-ditertiary butyl-4-methyl phenol, and a lean mother liquor corresponding essentially to the feed charge less the about 91% of 2,6-ditertiary butyl-4-methyl phenol separated in the first described separation step; separating the second crystalline product and the lean mother liquor; and recycling the separated second crystalline product for admixture with further feed charge and processing in the first described step.

DONALD D. DAVIDSON.

REFERENCES CITED

The following references are of record in the file of this patent:

UNITED STATES PATENTS

| Number | Name | Date |
|---|---|---|
| 1,940,065 | Spannagel et al. | Dec. 19, 1933 |
| 1,940,611 | Strosacker et al. | Dec. 19, 1933 |
| 1,943,078 | Kahl | Jan. 9, 1934 |
| 2,265,582 | Stevens et al. | Dec. 9, 1941 |
| 2,370,554 | Luten et al. | Feb. 27, 1945 |
| 2,428,102 | Swietoslawski | Sept. 30, 1947 |
| 2,435,792 | McArdle et al. | Feb. 10, 1948 |
| 2,470,116 | Swietoslawski et al. | May 17, 1949 |

OTHER REFERENCES

Chemical Engineers' Handbook, second edition; McGraw-Hill Book Co., New York, 1941; pages 1779–1794.